(12) United States Patent
Kubota et al.

(10) Patent No.: US 7,925,382 B2
(45) Date of Patent: Apr. 12, 2011

(54) ROBOT CONTROLLER AND ROBOT CONTROL METHOD

(75) Inventors: Tetsuya Kubota, Kobe (JP); Jun Fujimori, Kobe (JP); Naoyuki Matsumoto, Okayama-Ken (JP); Tetsuhiko Nishimura, Iwata (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 860 days.

(21) Appl. No.: 11/294,441

(22) Filed: Dec. 6, 2005

(65) Prior Publication Data

US 2006/0136094 A1    Jun. 22, 2006

(30) Foreign Application Priority Data

Dec. 8, 2004  (JP) .................................. 2004-355954

(51) Int. Cl.
*G05B 19/404*  (2006.01)
(52) U.S. Cl. .... 700/254; 700/250; 700/251; 318/568.11
(58) Field of Classification Search .................. 700/254, 700/251, 245, 247, 248, 250, 253, 257, 262, 700/263; 318/568.19, 568.1, 568.11, 568.22, 318/568.23; 901/2, 8
See application file for complete search history.

(56) References Cited

U.S. PATENT DOCUMENTS

| 5,189,351 | A * | 2/1993 | Torii et al. ................. 318/568.19 |
| 7,266,425 | B2 * | 9/2007 | Bhatt et al. ..................... 700/251 |
| 2002/0173878 | A1 * | 11/2002 | Watanabe et al. ............ 700/245 |
| 2004/0093119 | A1 * | 5/2004 | Gunnarsson et al. ......... 700/245 |

FOREIGN PATENT DOCUMENTS

| EP | 1 234 641 A | 8/2002 |
| EP | 1 250 986 A | 10/2002 |
| JP | A 60-205713 | 10/1985 |
| JP | S63-11292 A | 1/1988 |
| JP | A 02-198783 | 8/1990 |
| WO | WO 01/76830 A | 10/2001 |

OTHER PUBLICATIONS

Okada et al; "Method of Correcting Errors in Articulated Robot Mechanism"; Nippon Gakkai Ronbun-shu (Edition C); vol. 51; No. 462; pp. 324-331; Feb. 1985.
English-language translation of Japanese Office Action in Application No. 2004-355954, mailed Nov. 13, 2009.

* cited by examiner

*Primary Examiner* — Khoi Tran
*Assistant Examiner* — Spencer Patton
(74) *Attorney, Agent, or Firm* — Oliff & Berridge, PLC

(57) ABSTRACT

An input unit enters angular displacements by which drive shafts of a robot arm are to be turned as teaching data into a control unit. The control unit converts the input angular displacements into position-attitude data, namely, converted commands, indicating a position of the free end of the robot arm and an attitude of the robot in a rectangular coordinate system through forward conversion. The control unit corrects the position-attitude data on the basis of inherent errors in the robot to provide corrected position-attitude data. The control unit converts the corrected position-attitude data into corrected angular displacements through inverse conversion and gives the corrected angular displacements to an actuator included in the robot. The inherent errors in the robot include mechanismic errors resulting from machining errors and assembling errors, installation errors and errors in the origins of axes.

9 Claims, 11 Drawing Sheets

ROBOT CONTROLLER AND ROBOT CONTROL METHOD

CROSS REFERENCE TO RELATED APPLICATIONS

This application is based upon the prior Japanese Patent Application No. 2004-355954 filed on Dec. 8, 2004, the entire contents of which are incorporated herein by reference.

BACKGROUND OF THE INVENTION

1. Field of the Invention

The present invention relates to a robot controller and a robot control method for controlling a robot to position its robot arm.

2. Description of the Related Art

Industrial robots are used widely for a variety of purposes including spot welding, boring, arc welding and laser machining. A six-axis articulated robot, for example, has a base and a robot arm. Set points, the positions of the free end of the robot arm at the set points and angular positions of the robot arm at the set points are given to the industrial robot (hereinafter referred to simply as "robot") before the robot operates, to achieve tasks. The set point is a working position where a workpiece is machined with a tool attached to the free end of the robot arm.

The robot is taught by, for example, an off-line teaching method or a direct teaching method, namely, a manual teaching method. The off-line teaching method enters teaching data produced by an external computer or the like into the robot controller. The teaching data specifies a set point, and a position of the free end of the robot arm and an attitude of the robot at the set points (hereinafter, referred to as "the position and attitude of the robot"). The direct teaching method, namely, the manual teaching method, is carried out directly by the operator by operating an input device, such as a teaching pendant included in the robot controller.

The position and attitude of the robot are specified by position-attitude data indicating a position and an attitude of the robot in a rectangular coordinate system or by angular displacements by which drive shafts for driving the robot arm are to be turned. When teaching data is the positional and attitudinal values in the rectangular coordinate system, the robot controller converts the positional and attitudinal values in the rectangular coordinate system into corresponding shaft angular displacements and controls the robot to turn the drive shafts of the robot by the specified angular displacements.

The robot has errors including machining errors, assembling errors, errors caused by a deflection of the robot and errors in the origins of coordinate systems for the shafts. Consequently, the actual position and the actual attitude of the robot differ respectively from a desired position and a desired attitude. Therefore, the robot needs to be instructed of a corrected position and a corrected attitude obtained by correcting positional and attitudinal deviations due to errors in the specified position-attitude data.

A first technique relating to a positional error correcting system for an industrial robot is disclosed in JP-A 60-205713. This positional error correcting system corrects errors in specified working positions of the robot through the correction of specified operation data. This positional error correcting system corrects teaching data specifying operations and taught to the robot by an off-line teaching method on the basis of previously measured three-dimensional error data. Specifically, the three-dimensional error data is a three-dimensional map of positional deviations in a three-dimensional coordinate system.

A second technique relating to a positioning data correcting system for an industrial robot is disclosed in JP-A 2-198783. This positioning data correcting system corrects positioning data specifying positions of the robot in a rectangular coordinate system. This positioning data correcting system corrects positioning instructions, namely, teaching data provided by an off-line teaching method, on the basis of previously produced and stored inherent errors in the robot before converting the teaching data into corresponding angular displacements of the drive shafts. The inherent errors in the robot are, for example, positional deviations in a coordinate system and an error in the length of the robot arm.

A third technique relating to an error correcting system is mentioned in Takushi Okada and one other, "Takansetsu Robotto Kikou Gosa Hosei Houshiki (Method of Correcting Errors in Articulated Robot Mechanism)" Nippon Kikai Gakkai Ronbun-shu (Edition C), Vol. 51, No. 462, pp. 324-331, February, 1985, Nippon Kikai Gakkai. This error correcting system corrects the positional deviation attributable to mechanismic errors resulting from machining errors and assembling errors, installation errors and errors in the origins of axes. The error correcting system measures the positional deviation of the robot hand from a desired position, estimates errors in the robot through linear approximation using the measured positional deviation, and corrects the position-attitude of the robot hand on the basis of the estimated errors.

In some cases, the off-line teaching method specifies angular displacements for the shafts. All the foregoing known techniques corrects the positional attitudinal values on the basis of the previously determined inherent errors in the robot and do not correct the angular displacements for the shafts.

For example, there are a plurality of angular displacements for each of the shafts to set the robot at a position and in an attitude specified by the positional and attitudinal values in a rectangular coordinate system. Therefore, in some cases, the attitude of the robot cannot be uniquely determined and angular displacements for the shafts are taught to the robot to specify the attitude of the robot uniquely. However, all the foregoing known techniques cannot correct the specified angular displacements and hence cannot position the robot accurately.

Since corrections for correcting errors in positional and attitudinal values are not proper for the position-attitude of the robot arm in a marginal region of the operating range of the robot arm or the off-line teaching method does not specify data on obstructive cables and such, the off-line teaching method requires the manual correction of the teaching data.

Thus the teaching data includes teaching data produced by the off-line teaching method and teaching data produced by manual teaching. The foregoing known techniques, however, cannot handle the teaching data including both the teaching data produced by the off-line teaching method and teaching data produced by manual teaching and hence cannot achieve accurate positioning.

The robot is used not only as a positioning device, but also, in some cases, as a three-dimensional measuring device. For example, the robot hand attached to the free end of the robot arm is positioned at the datum position of the workpiece or a jig holding the workpiece by operating a teaching pendant to measure the position of the robot in the rectangular coordinate system, angular displacements of the shafts are measured and the position and the attitude of the robot in the rectangular coordinate system is calculated using the measured angular displacements.

The angular displacements measured by the robot correspond to a correct position determined by correcting a positional deviation attributable to the inherent errors in the robot. When the robot used for measurement malfunctions and is replaced with another robot, another robot cannot be accurately positioned by using the angular displacements measured by the replaced robot because the angular displacements are specific to the replaced robot used for measurement.

SUMMARY OF THE INVENTION

Accordingly, it is desirable to provide a robot controller capable of accurately positioning a robot by using a teaching by angular displacements for the shafts of the robot.

The present invention provides a robot controller for controlling a robot including a robot arm having a free end, and drive shafts, comprising: input means for entering angular displacements by which drive shafts of the robot arm are to be turned; forward conversion means for converting the angular displacements entered by the input means into position-attitude data indicating a position of the free end of the robot arm and an attitude of the robot in a rectangular coordinate system through a forward conversion; correcting means for correcting the position-attitude data provided by the forward conversion means based on inherent errors in the robot; inverse conversion means for converting corrected position-attitude data corrected by the correcting means into corrected angular displacements through an inverse conversion; and instructing means for instructing the robot of the corrected angular displacements provided by the inverse conversion means.

According to the present invention, the input means enters the angular displacements by which the drive shafts are to be turned, the forward conversion means converts the angular displacements entered by the input means into position-attitude data indicating a position of the free end of the robot arm and an attitude of the robot in the rectangular coordinate system through forward conversion, the correcting means corrects the position-attitude data provided by the forward conversion means on the basis of inherent errors in the robot, the inverse conversion means converts the corrected position-attitude data corrected by the correcting means into corrected angular displacements through inverse conversion, and the instructing means instructs the robot of the corrected angular displacements provided by the inverse conversion means.

Accordingly, the positional deviation of the free end of the robot arm of the robot attributable to the inherent errors in the robot can be corrected by converting the angular displacements entered as command values into the position-attitude data through the forward conversion.

Preferably, the input means is able to further enter position-attitude data. The correcting means selects either the position-attitude data entered by the input means or the position-attitude data obtained through the forward conversion by the forward conversion means in accordance with a predetermined condition and corrects selected position-attitude data.

According to the present invention, the position-attitude data indicating a position of the free end of the robot arm and an attitude of the robot in the rectangular coordinate system can also be entered. Therefore, the positional deviation attributable to the inherent errors in the robot can be corrected regardless of whether the teaching data produced by an off-line teaching method is either the position-attitude data in the rectangular coordinate system or the angular displacements.

Preferably, the robot controller further comprises: data acquiring means for acquiring angular displacements of the drive shafts measured by the robot; inverse correction means for converting the angular displacements acquired by the data acquiring means into position-attitude data through a forward conversion and correcting the position-attitude data obtained through the forward conversion to provide corrected position-attitude data not causing any positional deviations attributable to the inherent errors in the robot; and output means for providing the corrected position-attitude data corrected by the inverse correction means.

According to the present invention, the angular displacements measured by the robot are acquired and are converted into position-attitude data through forward data conversion, the position-attitude data obtained through forward conversion is corrected taking into consideration the positional deviation attributable to the inherent errors in the robot to obtain the corrected position-attitude data and the corrected position-attitude data is provided. Therefore, even if the angular displacements are taught by the off-line teaching method, the correct position-attitude data determined by taking into consideration the positional deviation attributable to the inherent errors in the robot can be provided.

Preferably, the robot controller further comprises second inverse conversion means for converting the corrected position-attitude data corrected by the inverse correction means into angular displacements through an inverse conversion. The output means further outputs the angular displacements provided by the second inverse conversion means through the inverse conversion.

According to the present invention, the position-attitude data obtained through forward conversion is corrected to provide the corrected position-attitude data determined by taking into consideration the positional deviation attributable to the inherent errors in the robot and the angular displacements obtained by converting the corrected position-attitude data through inverse conversion is provided. Therefore, even if the teaching data produced by the off-line teaching method is position-attitude data indicating a position of the free end of the robot arm and an attitude of the robot in the rectangular coordinate system, the angular displacements determined by taking into consideration the positional error attributable to the inherent errors in the robot can be provided.

The present invention provides a robot controller for controlling a robot including a robot arm having a free end, and drive shafts, comprising: input means for entering angular displacements by which the drive shafts of the robot arm are to be turned and position-attitude data indicating a position of the free end of the robot arm and an attitude of the robot in a rectangular coordinate system; correcting means for correcting the position-attitude data entered by the input means based on inherent errors in the robot; inverse conversion means for converting corrected position-attitude data corrected by the correcting means into angular displacements through an inverse conversion; and instructing means for selecting either the angular displacements entered by the input means or the angular displacements obtained through the inverse conversion by the inverse conversion means in accordance with a predetermined condition and instructing the robot of selected angular displacements.

According to the present invention, the input means enters angular displacements by which the drive shafts of the robot are to be turned and position-attitude data indicating a position of the free end of the robot arm and an attitude of the robot in the rectangular coordinate system, the correcting means corrects the position-attitude data entered by the input means on the basis of inherent errors in the robot, the inverse conversion means converts the corrected position-attitude data corrected by the correcting means into corrected angular displacements through inverse conversion, and the instructing means selects either the angular displacements entered by the input means or the angular displacements provided by the inverse conversion means according to a predetermined condition and instructs the robot of the selected angular displacements.

Since the robot can be instructed of either the angular displacements entered by the input means or the angular displacements provided by the inverse conversion means, mixed data including both the position-attitude data that needs correction and the angular displacements that do not need correction can be used as commands.

Preferably, the robot controller further comprises forward conversion means for converting the angular displacements entered by the input means into position-attitude data through a forward conversion. The correcting means selects either the position-attitude data entered by the input means or the position-attitude data obtained through the forward conversion by the forward conversion means in accordance with a predetermined condition and corrects selected position-attitude data.

According to the present invention, the input angular displacements can be converted into the position-attitude data through forward conversion. Therefore, the angular displacements determined by taking into consideration the positional deviation attributable to the inherent errors in the robot can be provided.

Preferably, the robot controller further comprises: data acquiring means for acquiring angular displacements of the drive shafts measured by the robot; and output means for providing the angular displacements acquired by the data acquiring means.

According to the present invention, the data acquiring means acquires the measured angular displacements by which the drive shafts are to be turned measured by the robot, and the output means provides the angular displacements acquired by the data acquiring means. Thus, the corrected angular displacements determined by taking into consideration the positional deviation attributable to the inherent errors in the robot can be provided.

Preferably, the robot controller further comprises inverse correction means for converting the angular displacements acquired by the data acquiring means into position-attitude data through a forward conversion and correcting the position-attitude data obtained through the forward conversion to provide correct position-attitude data not causing any positional deviation attributable to the inherent errors in the robot. The output means provides the corrected position-attitude data corrected by the inverse correction means.

According to the present invention, the inverse correction means converts the angular displacements acquired by the data acquiring means into position-attitude data the through forward conversion and corrects the position-attitude data obtained through the forward conversion to provide position-attitude data not causing any positional deviation attributable to the inherent errors in the robot, and the output means provides the corrected position-attitude data corrected by the inverse correction means. Therefore, the position-attitude data indicating a position not including a positional deviation attributable to the inherent errors in the robot, namely, the position-attitude data indicating a correct position of the free end of the robot arm and a correct attitude of the robot, can be provided.

Preferably, the robot controller further comprises second inverse conversion means for converting the corrected position-attitude data corrected by the inverse correction means into angular displacements. The output means provides the angular displacements provided by the second inverse conversion means.

According to the present invention, the second inverse conversion means converts the correct position-attitude data corrected by the inverse correction means into angular displacements, and the output means provides the angular displacements provided by the second inverse conversion means. Therefore, even if manually taught angular displacements are used as commands, the output means provides the angular displacements that determine a position not deviating by a positional deviation attributable to the inherent errors in the robot from a desired position.

Preferably, the robot controller further comprises storage means for storing the angular displacements acquired by the data acquiring means. The instructing means selects either the angular displacements entered by the input means or the angular displacements stored in the storage means in accordance with a predetermined condition and instructs the robot of selected angular displacements.

According to the present invention, the storage means stores the angular displacements acquired by the data acquiring means, and the instructing means selects either the angular displacements entered by the input means or the angular displacements stored in the storage means according to a predetermined condition and instructs the robot of the selected angular displacements. Thus, the measured angular displacements measured by the robot can be stored and the stored angular displacements can be used as commands.

The present invention provides a robot control method of controlling a robot including a robot arm having a free end, and drive shafts, comprising: a forward conversion step of converting angular displacements by which the drive shafts are to be turned into position-attitude data indicating a position of the free end of the robot arm and an attitude of the robot in a rectangular coordinate system through a forward conversion; a correcting step of correcting the position-attitude data obtained in the forward conversion step based on inherent errors in the robot; an inverse conversion step of converting the position-attitude data corrected by the correcting step into angular displacements through an inverse conversion; and an instructing step of instructing the robot of the angular displacements obtained through the inverse conversion in the inverse conversion step.

According to the present invention, the forward conversion step converts angular displacements by which the drive shafts are to be turned into position-attitude data indicating a position of the free end of the robot arm and an attitude of the robot in the rectangular coordinate system through the forward conversion, the correcting step corrects the position-attitude data obtained in the forward data conversion step on the basis of inherent errors in the robot, the inverse data conversion step converts the position-attitude data corrected in the correcting step into angular displacements through inverse conversion, and the instructing step instructs the robot of the angular displacements obtained through inverse conversion in the inverse data conversion step.

The positional deviation attributable to the inherent errors in the robot can be corrected by converting the angular displacements entered as command values into the position-attitude data through forward conversion.

As mentioned above, according to the present invention, the positional deviation attributable to the inherent errors in the robot can be corrected by converting the angular displacements entered as command values into the position-attitude data through the forward conversion. Therefore, even if the angular displacements are produced by an off-line teaching method, the robot can be accurately positioned.

According to the present invention, the positional deviation attributable to the inherent errors in the robot may be corrected even if either of the position-attitude data indicating a position of the free end of the robot arm and an attitude of the robot in the rectangular coordinate system and the angular displacements are data produced by an off-line teaching method. Consequently, the robot may be accurately positioned even if the angular-displacements are those specified by the off-line teaching method.

According to the present invention, the position-attitude data indicating a position not deviating from a desired position by a positional deviation attributable to the inherent errors in the robot may be provided even if the angular displacements are those specified by an off-line teaching method. Therefore, the position-attitude data provided by the output means may be used as commands capable of correcting position and attitude for other robots.

According to the present invention, the angular displacements that do not cause any positional deviation attributable to the inherent errors in the robot may be output even if the position-attitude data indicating a position of the free end of the robot arm and an attitude of the robot in the rectangular coordinate system is teaching data specified by an off-line teaching method. Therefore, when the output angular displacements are used as commands for other robots capable of correcting the angular displacements, the other robots can be accurately and uniquely positioned.

According to the present invention, the data including both the position-attitude data that needs correction and the angular displacements that do not need correction may be used as commands. Therefore, operations for positioning the free end of the robot arm of the robot may be accurately controlled even if the teaching data specified by an off-line teaching method is manually corrected.

According to the present invention, the angular displacements may be corrected so that any positional deviation attributable to the inherent errors in the robot may not be caused. Therefore, operations for positioning the robot may be accurately controlled even if the teaching data produced by an off-line teaching method is either of the position-attitude data indicating a position in the rectangular coordinate system and the angular displacements.

According to the present invention, the angular displacements, which are corrected so that any positional deviation attributable to the inherent errors in the robot may not be caused, can be provided. Therefore, when the output angular displacements are used as commands to be given to the robot, the commands may not need correction. Consequently, the robot may be surely positioned at a manually taught position when the manually taught angular displacements are given to the robot without correcting the same.

According to the present invention, the position-attitude data that does not cause any positional deviation attributable to the inherent errors in the robot, namely, position-attitude data indicating a correct position of the free end of the robot arm and a correct attitude of the robot, may be provided. Therefore, the output position-attitude data may be used as commands to be given to the robot. Since the output position-attitude data indicating a correct position of the free end of the robot arm and a correct attitude of the robot may be obtained through the conversion of the manually taught angular displacements, the calibration of a tool by the robot and the calculation of a coordinate system for a workpiece may be accurately achieved. When the robot is used as a three-dimensional measuring device, accurate positional measurement may be achieved.

According to the present invention, the angular displacements that do not cause any positional deviation attributable to the inherent errors in the robot may be provided even if the angular displacements are manually specified. Therefore, when the output angular displacements are used as commands for other robots, the position and attitude of the other robots may be accurately and uniquely determined.

According to the present invention, the measured angular displacements measured by the robot may be stored and may be used as commands. Therefore, the robot may be surely positioned at a manually taught position.

According to the present invention, the positional error attributable to the inherent errors in the robot may be corrected by using the position-attitude data obtained through the forward conversion of the input angular displacements as commands. Therefore, operations for positioning the robot can be accurately controlled even if the angular displacements are those specified by an off-line teaching method.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
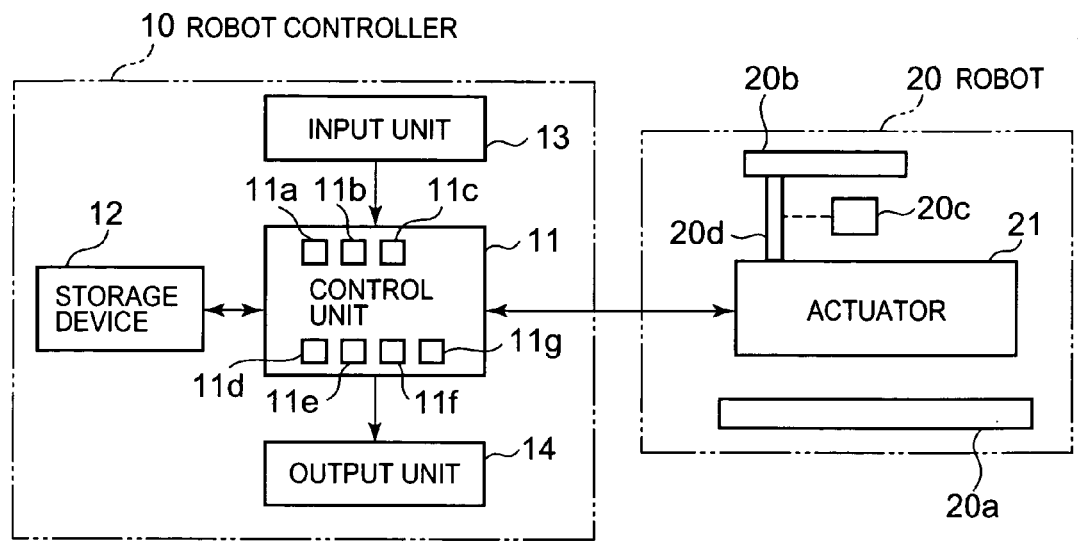
FIG. 1 is a block diagram of a robot controller in a preferred embodiment according to the present invention.

Referring to FIG. 1 showing a robot controller 10 in a preferred embodiment according to the present invention, the robot controller 10 includes a control unit 11, a storage device 12, an input unit 13 and an output unit 14.

Practically, the control unit 11 is a central processing unit (CPU). The control unit 11 controls all the operations of the robot controller 10 and a robot 20. The storage device 12 is, for example, a semiconductor storage device or a magnetic disk storage device. The storage device 12 stores programs to be executed by the control unit 11 and teaching data.

The input unit 13 enters, for example, teaching data produced by an off-line teaching method and manually taught data into the control unit 11. The output unit 14 gives, for example, angular displacements by which drive shafts of the robot 20 have been turned to locate the end effector of the robot 20 to a display, such as a liquid crystal display, to display the angular displacements on the screen of the display.

The robot 20 is, for example, a six-axis articulated robot. The robot 20 includes a base 20a, a robot arm 20b, an actuator 21 for driving the robot arm 20b, and angle sensors 20c, for measuring angular displacements by which drive shafts 20d for driving arms of the robot arm are turned.

When the input unit 13 enters angular displacements by which the drive shafts of the robot arm 20 are to be turned as teaching data into the control unit 11, the control unit 11 converts the input angular displacements into position-attitude data through forward data conversion. The position-attitude data indicates a position of the free end of the robot arm and an attitude of the robot 20. Then, the position-attitude data is corrected on the basis of inherent errors in the robot 20 to correct a positional deviation attributable to the inherent errors. The corrected position-attitude data is converted into corrected angular displacements through inverse data conversion. Then, the actuator 21 is instructed of the corrected angular displacements. The inherent errors inherent in the robot 20 are, for example, mechanismic errors resulting from machining errors and assembling errors, installation errors and errors in the origins of axes.

The position-attitude data is corrected by, for example, an error correcting system mentioned in "Takansetsu Robotto Kikou Gosa Hosei Houshiki (Method of Correcting Errors in Articulated Robot Mechanism)" Nippon Kikai Gakkai Ronbun-shu (Edition C), Vol. 51, No. 462, February, 1985. More specifically, Deviations of the position and attitude of the robot hand of the robot 20 from a correct position and a correct attitude are measured, inherent errors in the robot 20 are estimated from the measured deviations, and the position-attitude data is corrected on the basis of the estimated inherent errors. Hereinafter, correction achieved by this error correcting system will be referred to as accurate robot model correction.

The angular displacements given to the robot 20 can be corrected to correct the positional deviation. Thus, operations for positioning the robot hand of the robot 20 can be accurately controlled.

The control unit 11 is able to give the actuator 21 either the corrected position-attitude data produced by correcting and converting by inverse data conversion the input position-attitude data or the input angular displacements.

The control unit 11 obtains measured angular displacements of the drive shafts of the robot arm of the robot 20 measured by the robot 20 and converts the measured angular displacements into position-attitude data for a rectangular coordinate system through forward data conversion. The position-attitude data obtained through forward data conversion is corrected to provide corrected position-attitude data that does not cause any positional deviation attributable to the inherent errors in the robot 20 through inverse data correction. The corrected position-attitude data is converted into corrected angular displacements through inverse data conversion. Then, the output unit 14 provides the corrected angular displacements. Inverse data correction is the correction of the position-attitude data for which a positional deviation attributable to errors in the robot 20 has been corrected to provide the position-attitude data that does not cause positional deviation attributable to errors in the robot 20. This correction provides position-attitude data that can be used as commands for other robots. For the robot 20, the correction is an operation to provide position-attitude data that needs correction relating with errors in the robot 20.

The control unit 11 is able to make the output unit 14 provide the position-attitude data obtained through inverse data correction or to make the output unit 14 provide the measured angular displacements measured by the robot 20.

The input unit 13 is an input means. Programs to be executed by the control unit 11 can realize a forward conversion means 11a, a correcting means 11b, an inverse conversion means 11c, an instructing means 11d, an inverse correction means 11e, a data obtaining means 11f and a second inverse conversion means 11g. The output unit 14 is an output means.

Figure 2:
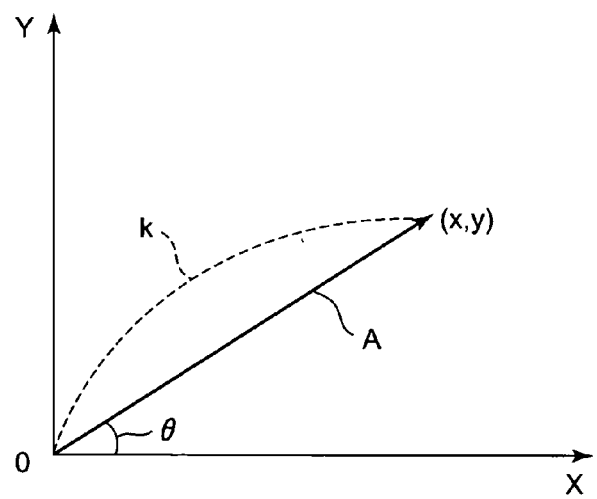
FIG. 2 is a graph of assistance in explaining a forward data conversion procedure and an inverse data conversion procedure to be carried out by a control unit included in the robot controller shown in FIG. 1.

FIG. 2 is a graph of assistance in explaining a forward data conversion procedure and an inverse data conversion procedure to be carried out by the control unit 11 of the robot controller 10 shown in FIG. 1. The robot 20 has a plurality of arms 20b shown in FIG. 1 including an arm A shown in FIG. 2. FIG. 2 shows a condition of the arm A in a two-dimensional space. The arm A is able to turn on a shaft having an axis passing the origin O of a rectangular coordinate system defined by X- and Y-axis. In FIG. 2, the arm A has been turned through an angle $\theta$ from the X-axis.

Coordinates x and y that designate the position of the free end of the arm A in the rectangular coordinate system are expressed by: $x = k \cdot \cos\theta$ and $y = k \cdot \sin\theta$. A procedure for determining the coordinates x and y from the angle $\theta$ will be called forward conversion. A procedure for determining the angle $\theta$ from the coordinates x and y will be called inverse conversion.

Figure 3:
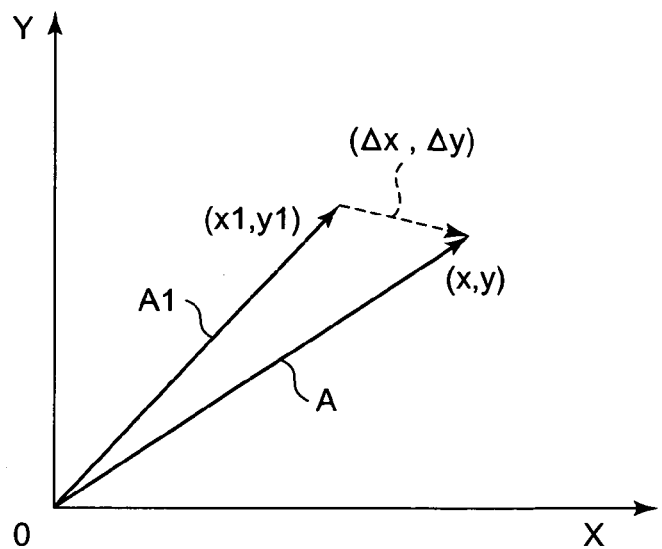
FIG. 3 is a graph of assistance in explaining a positional deviation correcting procedure to be carried out by the control unit included in the robot controller shown in FIG. 1.

FIG. 3 is a graph of assistance in explaining a positional deviation correcting procedure to be carried out by the control unit 11 included in the robot controller 10 shown in FIG. 1. The coordinates x and y designating the position of the free end of the arm A are teaching data specified by an off-line teaching method. When a position designated by coordinates x1 and y1 is specified to position the free end of the arm A at the position designated by the coordinates x and y, the difference between the position (x, y) and the position (x1, y1) is the positional deviation ($\Delta x$, $\Delta y$) of the free end of the arm A, namely, the free end of the robot arm, from its correct position.

A procedure for specifying the position (x1, y1) to position the free end of the arm A at the desired position (x, y) taking into consideration the positional deviation ($\Delta x$, $\Delta y$) will be called correction. A procedure for specifying the correct position (x, y) taking into consideration the positional deviation ($\Delta x$, $\Delta y$) with respect to the position (x1, y1) measured by the robot 20 when the free end of the arm A is positioned at the position (x, y) will be called inverse correction.

Figure 4:
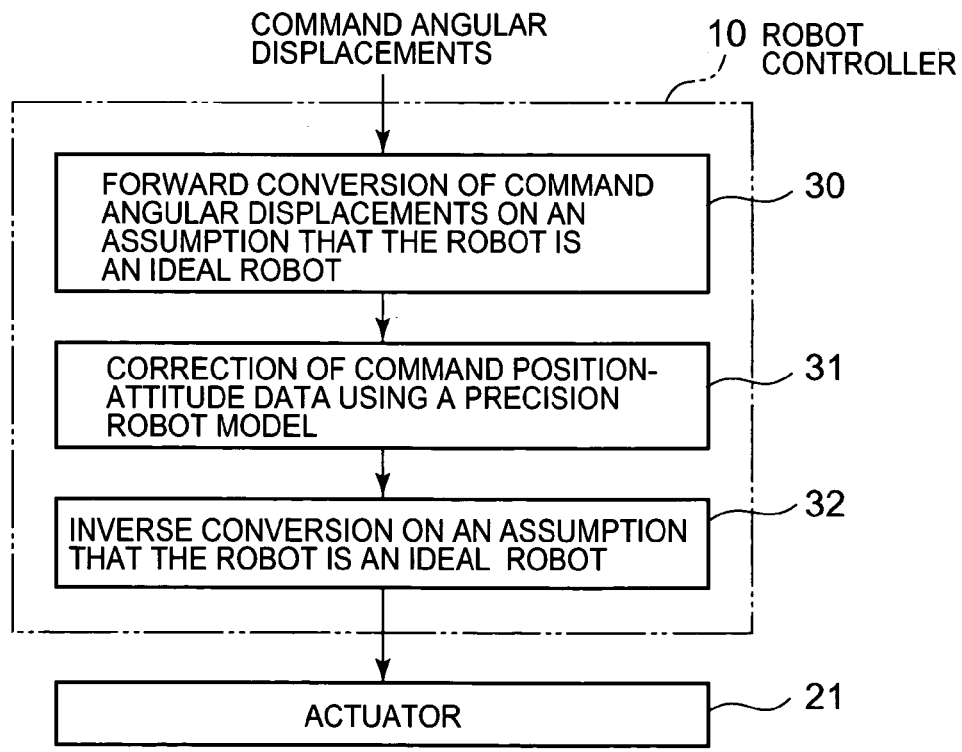
FIG. 4 is a block diagram of a first function of the robot controller shown in FIG. 1.

FIG. 4 is a block diagram of a first function of the robot controller 10 shown in FIG. 1. FIG. 4 shows the relation between functions when command angular displacements are specified as teaching data to be given to the robot 20. In a block 30, the command angular displacements entered into the robot controller 10 are converted into command position-attitude data through forward conversion and the command position-attitude data is given to a block 31. The forward conversion is performed in the block 30 on an assumption that the robot 20 is an ideal robot not having any errors at all and any correction is not necessary.

In the block 31, the command position-attitude data received from the block 30 is corrected on the basis of errors in the robot 20 by using, for example, a precision robot model to obtain corrected command position-attitude data. The corrected command position-attitude data is given to a block 32. In the block 32, the corrected command position-attitude data received from the block 31 is converted into command angular displacements through inverse conversion on an assumption that the robot 20 is an ideal robot. The angular displacements obtained through inverse conversion are given to the actuator 21.

The control unit 11 executes a program to exercise the functions of the blocks 30 to 32. The forward conversion means 11a, the correcting means 11b and the inverse conversion mean 11c are, for example, the blocks 30, 31 and 32, respectively.

Figure 5:
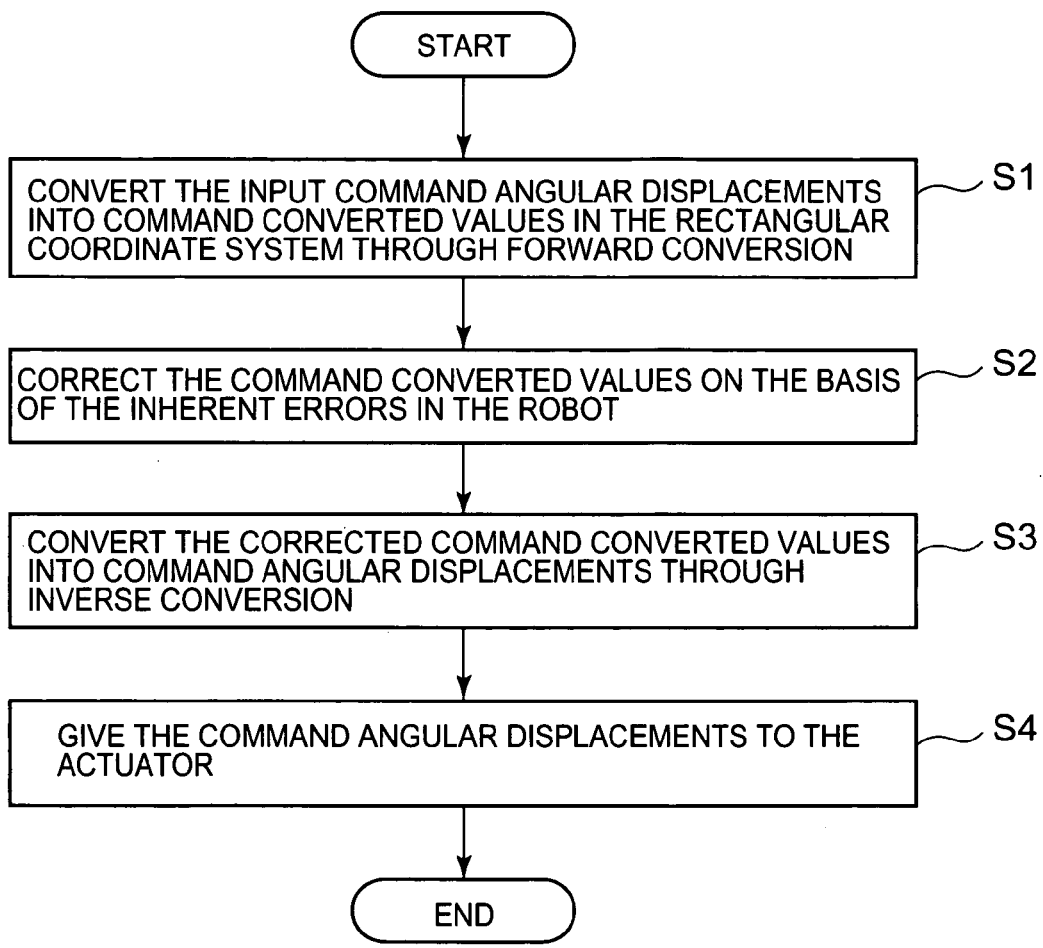
FIG. 5 is a flow chart of a control procedure to be carried out by the control unit included in the robot controller shown in FIG. 1 to exercise the first function shown in FIG. 4.

FIG. 5 is a flow chart of a control procedure to be carried out by the control unit 11 included in the robot controller 10 shown in FIG. 1 to exercise the first function shown in FIG. 4. Step 1 is executed when the input unit 13 enters command angular displacements into the control unit 11.

In step S1, the input command angular displacements are converted into command converted values in the rectangular coordinate system through forward conversion. In step S2, the command converted values are corrected on the basis of the inherent errors in the robot 20. In step S3, the corrected command converted values are converted into command angular displacements through inverse conversion. In step S4, the command angular displacements obtained through inverse conversion are given to the actuator 21, and the control procedure is ended. The command converted values are, for example, command position-attitude data specifying the position of the free end of the robot arm and the attitude of the robot arm in the rectangular coordinate system.

Thus, the input command angular displacements can be corrected to correct the positional deviation and, consequently, the free end of the robot arm of the robot 20 can be accurately positioned. Since the positional deviation attributable to the inherent errors in the robot 20 can be corrected through the conversion of the input command angular displacements into the position-attitude data through forward conversion, the operation for positioning the free end of the robot arm of the robot 20 can be accurately controlled even if the angular displacements are specified by an off-line teaching method.

Figure 6:
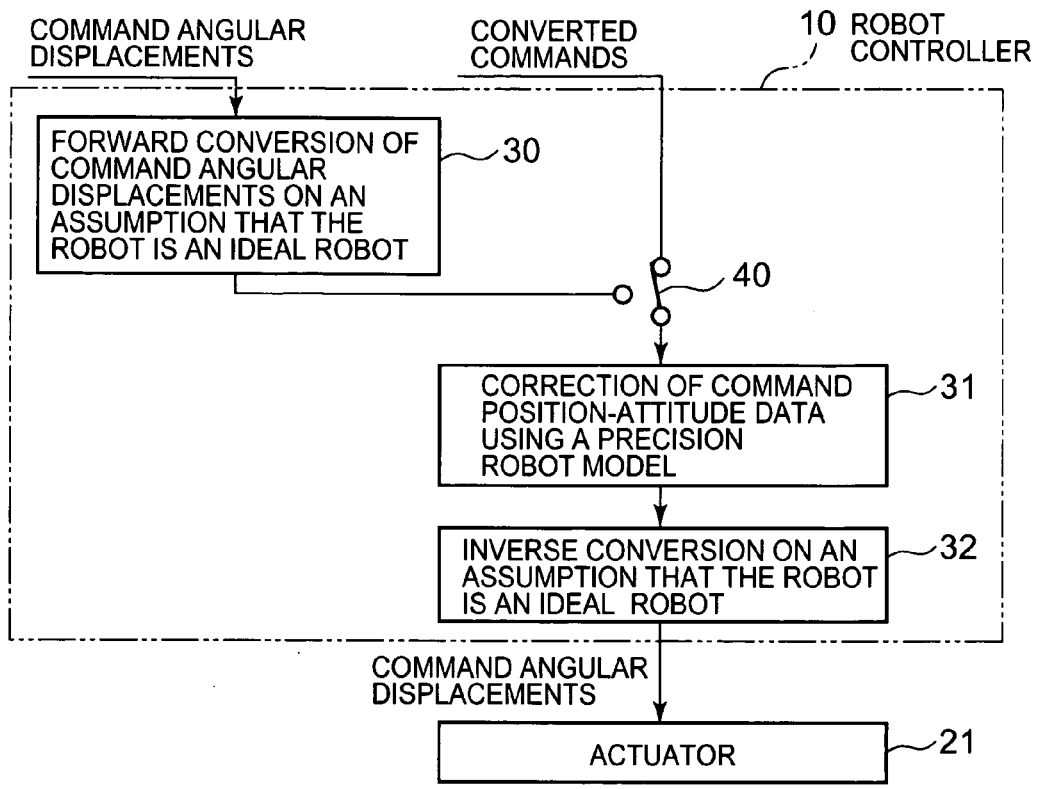
FIG. 6 is a block diagram of a second function of the robot controller shown in FIG. 1.

FIG. 6 is a block diagram of the second function of the robot controller 10 shown in FIG. 1. As shown in FIG. 6, a switch 40 is placed between the blocks 30 and 31 shown in FIG. 4 to enable entering the command converted values, such as the command position-attitude data in the rectangular coordinate system. When it is desired to enter the command angular displacements, the switch 40 is operated to connect the block 30 to the block 31. When it is desired to enter the command converted values, the switch 40 is operated to enter the command converted values into the block 31.

In FIG. 6, the switch 40 connects a line for entering the command converted values to the block 31 to enter the command converted values into the block 31. The block 31 corrects the input command converted values on the basis of the errors in the robot 20 and gives corrected command position-attitude data to the block 32. The block 32 converts the corrected command position-attitude data received from the block 31 into command angular displacements through inverse conversion and gives the command angular displacements to the actuator 21. The condition of the switch 40 is selectively determined according to a command entered by the input unit 13.

The command angular displacements obtained through correction on the basis of the errors in the robot 20 are given to the actuator 21 when the input teaching data is either of the command angular displacements and the command converted values. Therefore, the operation for positioning the free end of the robot arm of the robot 20 can be accurately controlled. The positional deviation attributable to the inherent errors in the robot 20 can be corrected when the teaching data is either of the position-attitude data in the rectangular coordinate system and the angular displacements. Thus, the operations for positioning the free end of the robot arm 20b of the robot 20 can be accurately controlled even if the teaching data is either the command angular displacements or the command converted values.

Figure 7:
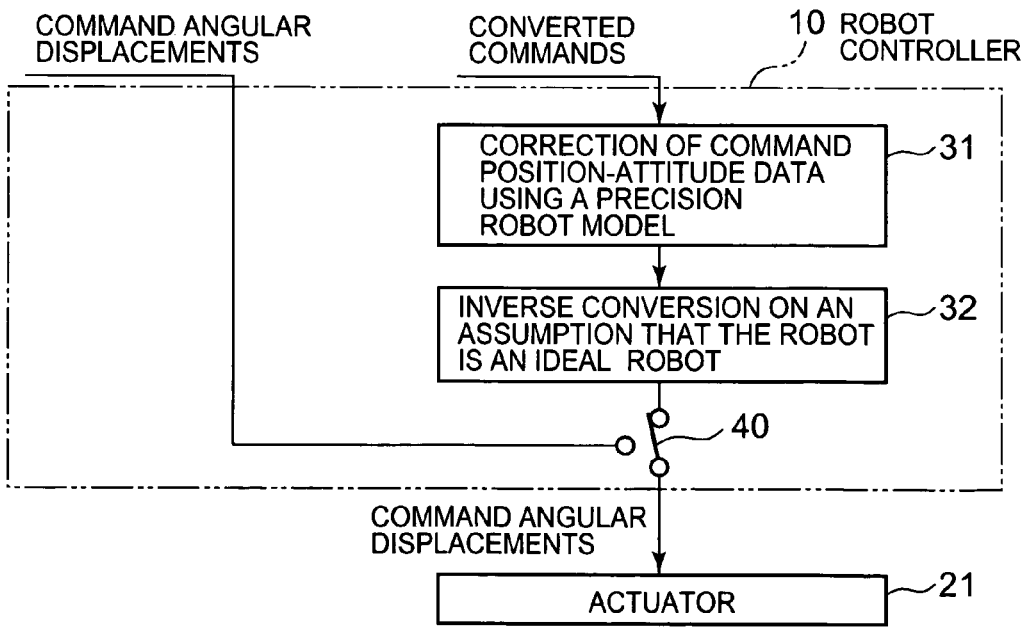
FIG. 7 is a block diagram of a third function of the robot controller shown in FIG. 1.

FIG. 7 is a block diagram of a third function of the robot controller 10 shown in FIG. 1. As shown in FIG. 7, a switch 41 is placed between the block 32 and the actuator 21 shown in FIG. 4 to enable selectively entering the command angular displacements provided in the block 32 through inverse conversion or the input command angular displacements into the actuator 21. In FIG. 7, the switch 41 connects the block 32 to the actuator 21 to give the actuator 21 the command angular displacements obtained through inverse conversion in the block 32. The condition of the switch 41 is selectively determined according to a command entered by the input unit 13.

When the switch 41 is set so as to give the input command angular displacements directly to the actuator 21, the angular displacements specified taking into consideration the errors in the robot 20, namely, the angular displacements that do not need correction, can be directly given to the actuator 21. More specifically, the operator leads the robot 20 by operating, for example, a teach pendant or by manually moving the robot arm of the robot 20 to position the free end of the robot arm of the robot 20 at a desired position and to set the robot 20 in a desired attitude and recording the angular displacements by which the drive shafts have been turned to position the robot arm at a desired position in a desired attitude. The recorded angular displacements are used as command angular displacements.

Since the command angular displacements that do not need correction can be entered, the angular displacements specified taking into consideration the positional deviation attributable to the errors in the robot 20 can be used as command angular displacements. When the input command angular displacements are given directly to the actuator 21, mechanical stoppers and soft limits for the drive shafts 20d operate so as to conform to instructions. Thus, directly giving the input command angular displacements to the actuator 21 is effective in surely grasping the limits of the respective operating ranges of the drive shafts.

Either the command angular displacements obtained by correcting the input command converted values and converting the corrected input command converted values through inverse conversion or the input command angular displacements can be selectively given to the actuator 21. Therefore, commands including both the command converted values that need correction and the command angular displacements that do not need correction can be handled. Values that need correction mean values that cause positional deviation attributable to the errors in the robot 20 and should be corrected.

For example, some teaching data needs to be specified directly by the operator when corrections specified on the basis of errors in a region near the limit of the operating range of the robot 20 is improper or when data on an obstacle, such as a cable or the like, to be avoided is not taken into consideration in specifying teaching data by an off-line teaching method. If the teaching data specified by an off-line teaching method is modified by the operator, both the teaching data specified by an off-line teaching method and the teaching data manually modified by the operator are used.

Thus, mixed data including the position-attitude data that needs correction and the angular displacements that do not need correction can be used as command data. Consequently, the operations for positioning the free end of the robot arm 20b of the robot 20 can be accurately controlled even if the teaching data specified by the off-line teaching method is manually modified by the operator.

The block 30 and the switch 40 shown in FIG. 6 are not shown in FIG. 7. The block 30 and the switch 40 may be placed in front of the block 31. The input command angular displacements may be converted by forward conversion by the block 30 and may be corrected by the block 31. The angular displacements that need correction or the angular displacements that do not need correction can be selectively entered.

Figure 8:
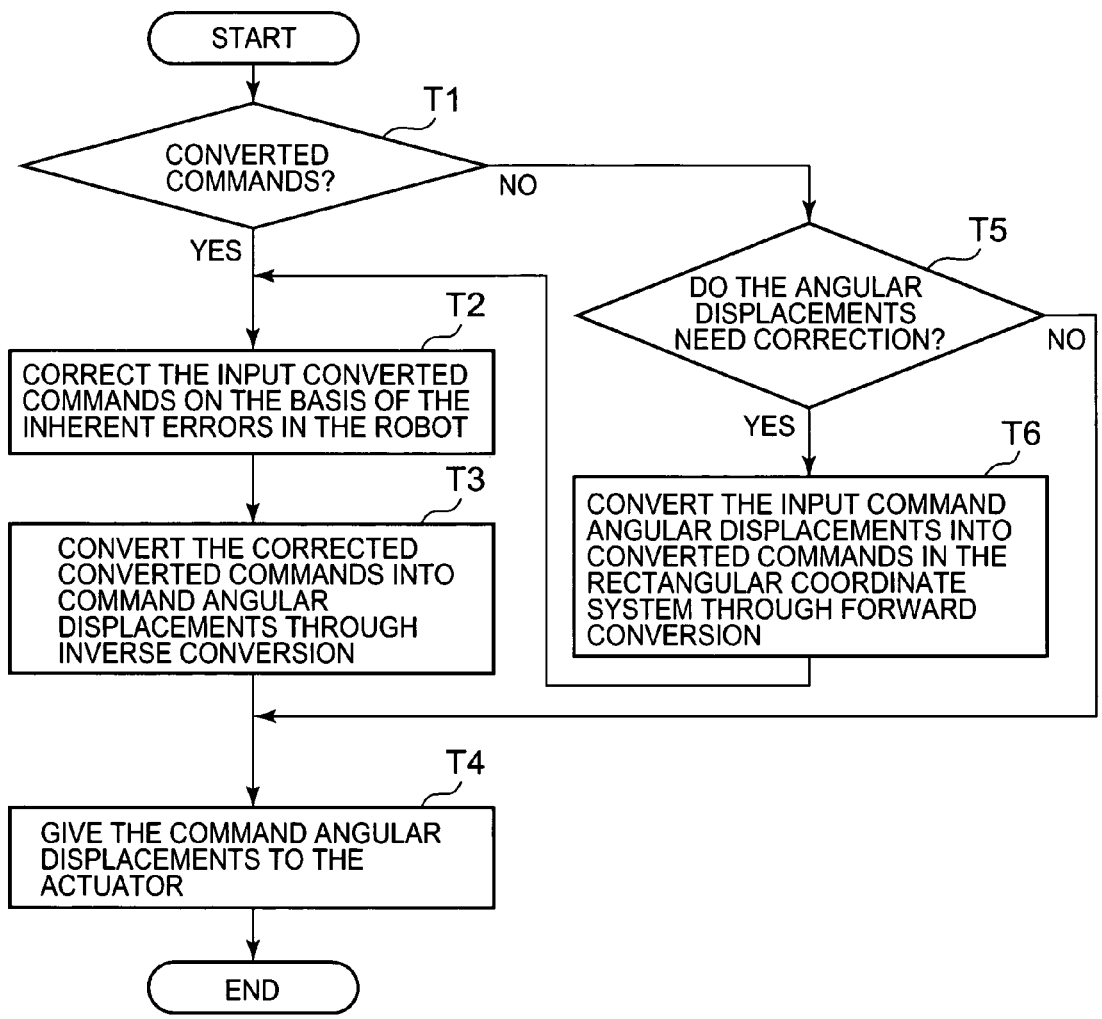
FIG. 8 is a flow chart of a command specifying procedure related with the functions shown in FIGS. 6 and 7.

FIG. 8 is a flow chart showing a command specifying procedure related with the functions shown in FIGS. 6 and 7 by way of example. The control unit 11 executes the command specifying procedure. Step T1 is executed when the command angular displacements or the command converted values are entered into the robot controller 10. In step T1, a query is made to see whether or not the commands entered into the robot controller 10 are the converted commands. Step T5 is executed when the response in step T1 is negative. Step T2 is executed when the response in step T1 is affirmative.

In step T2, the input converted commands or the converted commands obtained through forward conversion are corrected on the basis of the inherent errors in the robot 20 by using a precision robot model. In step T3, the corrected converted commands are converted into command angular displacements through inverse conversion. In step T4, the command angular displacements obtained through inverse conversion or the input command angular displacements are given to the actuator 21 and the command specifying procedure is ended.

In step T5, a query is made to see whether or not the input commands are command angular displacements that need correction. If the response in step T5 is affirmative, step T6 is executed. If the response in step T5 is negative, step T4 is executed. In step T6, the input command angular displacements are converted into converted commands in the rectangular coordinate system through forward conversion and the command specifying procedure goes to step T2.

Since each of the angular displacements can be corrected to avoid the positional deviation attributable to the inherent errors in the robot 20, the operation for positioning the free end of the robot arm of the robot 20 can be accurately controlled even if the teaching data specified by the off-line teaching method is either the position-attitude data in the rectangular coordinate system or the angular displacements. The converted commands that need correction and the command angular displacements that need correction to avoid the positional deviation attributable to the inherent errors in the robot 20 are corrected, and the command angular displacements that do not need correction are not corrected. Therefore, the operation for positioning the free end of the robot arm 20b of the robot 20 can be accurately controlled.

Figure 9:
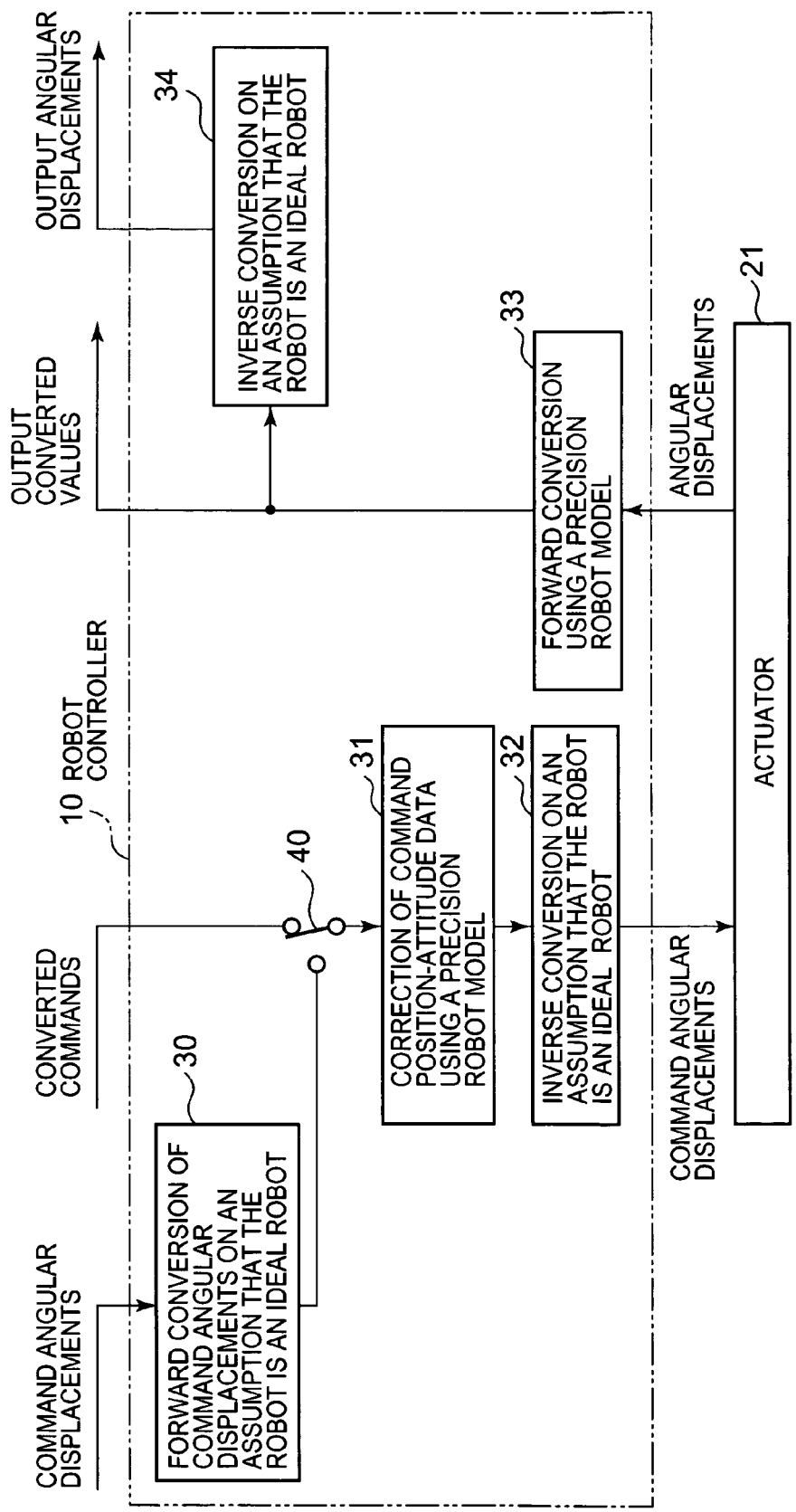
FIG. 9 is a block diagram of a fourth function of the robot controller shown in FIG. 1.

FIG. 9 is a block diagram of a fourth function of the robot controller 10 shown in FIG. 1. The fourth function measures the angular displacements by the actuator 21 and converts the measured angular displacements into output converted values that do not cause any positional deviation attributable to the inherent errors in the robot 20 and output angular displacements that do not cause any positional deviation attributable to the inherent errors in the robot 20. The actuator 21 measures the angular displacements of the drive shafts by angle sensors 20c, placed on the drive shafts 20d of the robot arm 20b.

A block 33 converts the measured angular displacements measured by the actuator 21 into position-attitude data through forward conversion, corrects the position-attitude data on the basis of the errors in the robot 20 through inverse correction by using, for example, a precision robot model, and provides output converted values. A block 34 converts the output converted values into output angular displacements through inverse conversion on an assumption that the robot 20 is an ideal robot not having any errors. Either of or both the output converted values and the output angular displacements may be provided according to an instruction given by the input unit 13.

Functions of the blocks 33 and 34 are specified in a program to be executed by the control unit 11. For example, the inverse correction means 11e and the second inverse conversion means 11g corresponds to the blocks 33 and 34, respectively.

Thus, the output converted values provided by the block 33 are values indicating a position not deviating from a correct position by a positional deviation attributable to the errors in the robot 20, namely, output values indicating a correct position of the free end of the robot arm 20b of the robot 20 and a correct attitude of the robot 20. Therefore, the output converted values can be used as commands for other robots incapable of correcting input angular displacements. Since the position-attitude data determined by taking into consideration the positional deviation attributable to the inherent errors in the robot 20 can be provided even if the angular displacements are specified by an off-line teaching method, the output position-attitude data can be used as commands for other robots capable of correcting position-attitude data.

Angular displacements that can be used as commands for other robots can be provided even if the input data is the position-attitude data in the rectangular coordinate system. Therefore, other robots can be accurately and uniquely positioned at a desired position in a desired attitude. Since the angular displacements determined by taking into consideration the positional deviation attributable to the inherent errors in the robot 20 can be provided even if the position-attitude data in the rectangular coordinate system are specified by an off-line teaching method, the output angular displacements can be used as commands for other robots capable of correcting angular displacements to position other robots accurately and uniquely at a desired position in a desired attitude.

Figure 10:
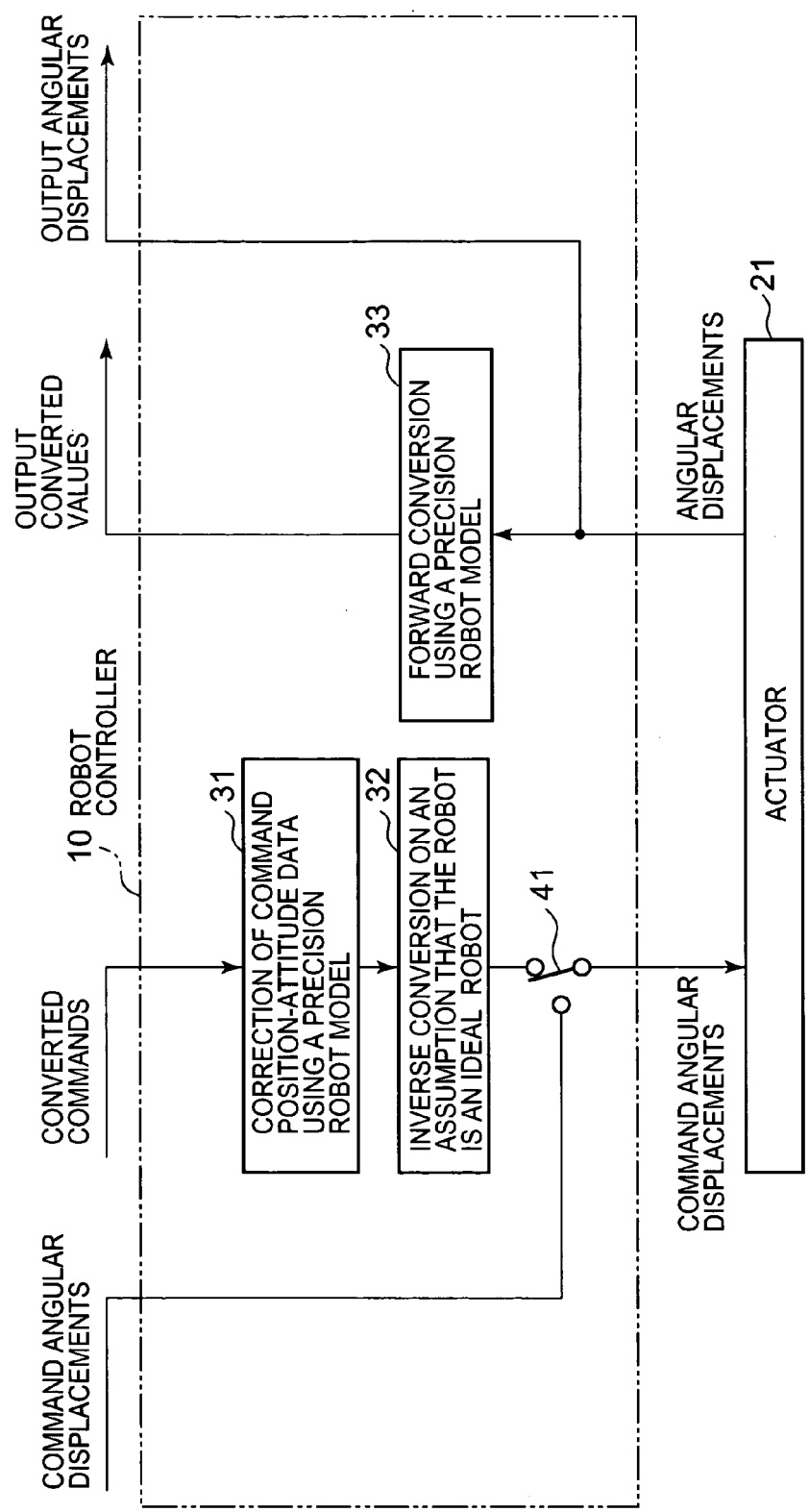
FIG. 10 is a block diagram of a fifth function of the robot controller shown in FIG. 1.

FIG. 10 is a block diagram of a fifth function of the robot controller 10 shown in FIG. 1. The fifth function measures the angular displacements by the actuator 21 and converts the measured angular displacements to provide output converted values that do not cause any positional deviation attributable to the inherent errors in the robot 20 and output angular displacements that do not cause any positional deviation attributable to the inherent errors in the robot 20.

The robot controller 10 provides the measured angular displacements measured by the actuator 21 as output angular displacements. The block 33 converts the measured angular displacements measured by the actuator 21 into position-attitude data through forward conversion, corrects the position-attitude data on the basis of the errors in the robot 20 through inverse correction by using, for example, a precision robot model and provides output converted values. Either of the output angular displacements and the output converted values may be provided selectively or both the output angular displacements and the output converted values may be provided according to an instruction provided by, for example, the input unit 13.

Since the angular displacements determined by taking into consideration the positional displacement attributable to the inherent errors in the robot 20 can be provided, the output angular displacements can be used without being corrected as commands for the robot 20. Thus, the free end of the robot arm can be surely positioned at a manually specified position when manually specified angular displacements are given without being corrected to the robot 20.

The position-attitude data determined by taking into consideration the positional deviation attributable to the inherent errors in the robot 20, namely, position-attitude data specifying a correct position of the free end of the robot arm of the robot 20 and a correct attitude of the robot 20, is provided. Thus, the output position-attitude data can be used as commands for other robots.

Although the block 34 shown in FIG. 9 is not shown in FIG. 10, the block 34 may be placed behind the block 33 to convert the output converted values provided by the block 33 into angular displacements through inverse conversion and to provide the angular displacements obtained through inverse conversion. Either of the output angular displacements and the output converted values may be provided selectively or both the output angular displacements and the output converted values may be provided according to an instruction provided by, for example, the input unit 13.

The output angular displacements determined by taking into consideration the positional deviation attributable to the errors in the robot 20 and the corrected output angular displacements determined so as to correct the positional deviation attributable to the errors in the robot 20 are provided. Therefore, those output values can be used as command angular displacements for other robots and the robot 20.

Figure 11:
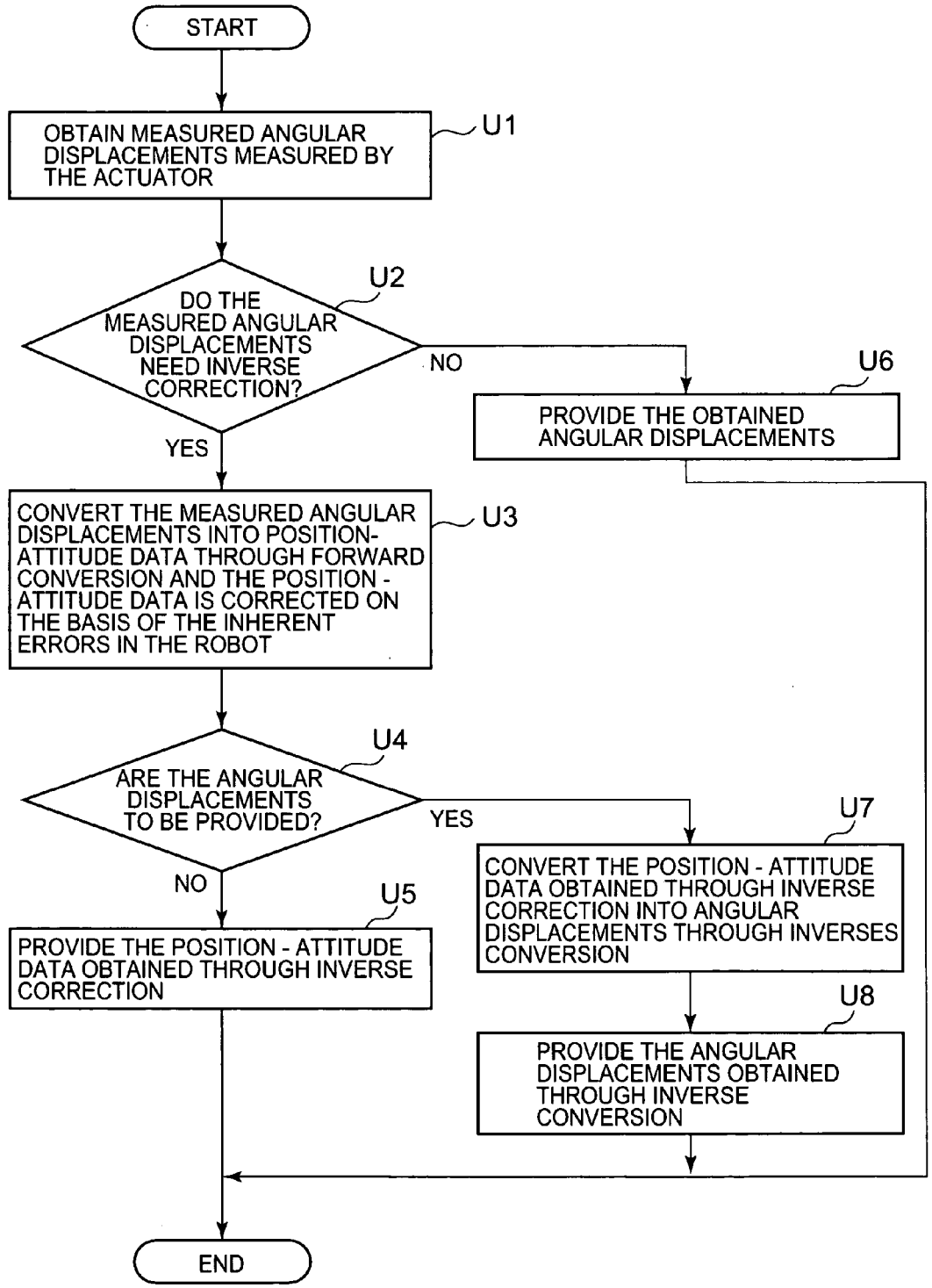
FIG. 11 is a flow chart of a measurement output procedure related with the functions shown in FIGS. 9 and 10.

FIG. 11 is a flow chart of a measurement output procedure related with the functions shown in FIGS. 9 and 10. The control unit 11 carries out the measurement output procedure. Step U1 is executed when measured angular displacements of the drive shafts of the robot 20 are provided. In step U1, the measured angular displacements measured by the actuator 21 are obtained from the robot 20.

In step U2, a query is made to see whether or not the measured angular displacements need to be corrected through inverse correction. If the response in step U2 is affirmative, step U3 is executed. If the response in step U2 is negative, step U6 is executed. In step U3, the measured angular displacements are converted into position-attitude data through forward conversion and the position-attitude data is corrected on the basis of the inherent errors in the robot 20 through inverse correction by using, for example, a precision robot model to provide correct position-attitude data that does not cause any positional deviation attributable to the errors in the robot 20.

In step U4, a query is made to see whether or not the angular displacements are to be provided. Step U7 is executed if the response in step U4 is affirmative. Step U5 is executed if the response in step U4 is negative. In U5, the position-attitude data obtained through inverse correction is provided as a converted value and the measurement output procedure is ended. In step U7, the position-attitude data obtained through inverse correction is converted into angular displacements. The angular displacements obtained in step U7 is provided in step U8 and the measurement output procedure is ended.

A position specified by the angular displacement measured by the robot 20 is determined by correcting a positional deviation attributable to the inherent errors in the robot 20 from a correct position. Therefore, the angular displacements determined by taking into consideration the positional deviation attributable to the errors in the robot 20 can be provided when either of the teaching data specified by an off-line teaching method and the teaching data specified by a manual teaching method is given as input commands for the robot controller 10.

The corrected angular displacements that do not cause any positional deviation attributable to the errors in the robot 20 can be converted into angular displacements or position-attitude data indicating a correct position of the free end of the robot arm 20b of the robot 20 and a correct attitude of the robot 20 and the angular displacement or the position-attitude data obtained through conversion can be provided. When the robot 20 malfunctions and is replaced with another robot, the angular displacement or the position-attitude data obtained through conversion can be used for controlling the robot replaced malfunctioning robot 20. The output angular displacements obtained through conversion can accurately position the free end of the robot arm of other robot and can uniquely set the other robot in an attitude even if the output angular displacements are manually specified angular displacements.

The manually specified angular displacements can be converted into the position-attitude data or the angular displacements indicating the correct position of the free end of the robot arm of the robot and the correct attitude of the robot. Therefore, the accurate calibration of the tool by the robot and the accurate calculation of the coordinate system for the workpiece can be achieved. When the robot is used as a three-dimensional measuring device, accurate positional measurement can be achieved.

More specifically, the attitude of the robot is specified by positioning the robot hand attached to the free end of the robot arm of the robot at a reference position on a workpiece or on a jig holding the workpiece by operating a teaching pendant or the like to determine the position of the workpiece in the rectangular coordinate system for the robot.

The robot controller 10 obtains the angular displacements indicating the position of the free end of the robot arm 20b of the robot 20 and the attitude of the robot from the robot 20. Then, the robot controller 10 converts the angular displacements, namely, the angular displacements determined by taking into consideration the positional deviation attributable to the errors in the robot 20, into corrected angular displacements or corrected position-attitude data indicating a correct position of the free end of the robot arm and a correct attitude of the robot 20, and provides the corrected angular displacements or the corrected position-attitude data. Thus, accurate positional measurement can be achieved by using the robot 20 as a three-dimensional measuring device.

Figure 12:
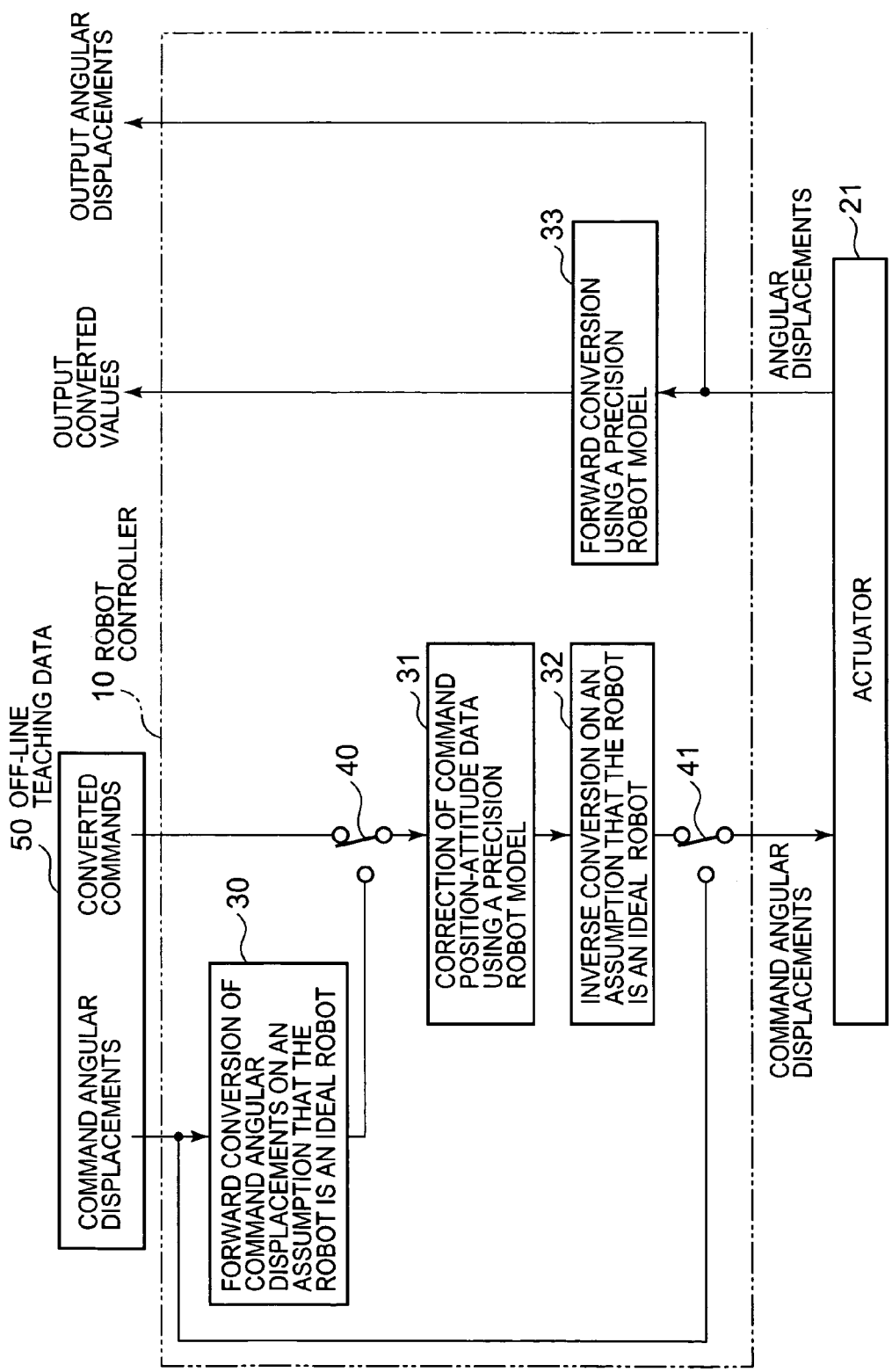
FIG. 12 is a block diagram of assistance in explaining operations to be performed when off-line teaching data is given to the robot controller shown in FIG. 1.

FIG. 12 is a block diagram of assistance in explaining operations to be performed when off-line teaching data 50 is given to the robot controller 10 shown in FIG. 1. The robot controller 10 shown in FIG. 12 is provided, in addition to the blocks of the robot controller 10 shown in FIG. 7, with the block 30 and the switch 40 placed in front of the block 31.

The off-line teaching data 50 specified by an off-line teaching method is given to the robot 20 to specify a position of the free end of the robot arm 20b and an attitude of the robot 20. The off-line teaching data 50 is produced by an external computer or the like and is given to the robot controller 10. The off-line teaching data 50 includes command angular displacements through which the drive shafts of the robot arm 20b of the robot 20 are to be turned and command converted values indicating a position of the free end of the robot arm 20b and an attitude of the robot 20 in the rectangular coordinate system.

The switch 40 connects the command converted values included in the off-line teaching data 50 to the block 31 to give the command converted values to the robot controller 10. The switch 40 can connect the block 30 to the block 31 to give the command angular displacements to the robot controller 10. The off-line teaching data 50 is commands determined by taking into consideration the positional deviation attributable to the inherent errors in the robot 20. The block 31 needs to execute a correcting procedure for correction on the basis of the inherent errors in the robot 20 when the commands are either of the command converted values and the command angular positions.

When the off-line teaching data 50 is given to the robot controller 10, correction based on the inherent errors in the robot 20 is necessary. A switch 41 is connected to the output part of the block 32. The output of the block 32 is given to the actuator 21.

The positional deviation attributable to the inherent errors in the robot 20 can be corrected when either of the command angular positions and the command converted values of the off-line teaching data 50 are given. Consequently, the free end of the robot arm 20b can be accurately positioned.

Figure 13:
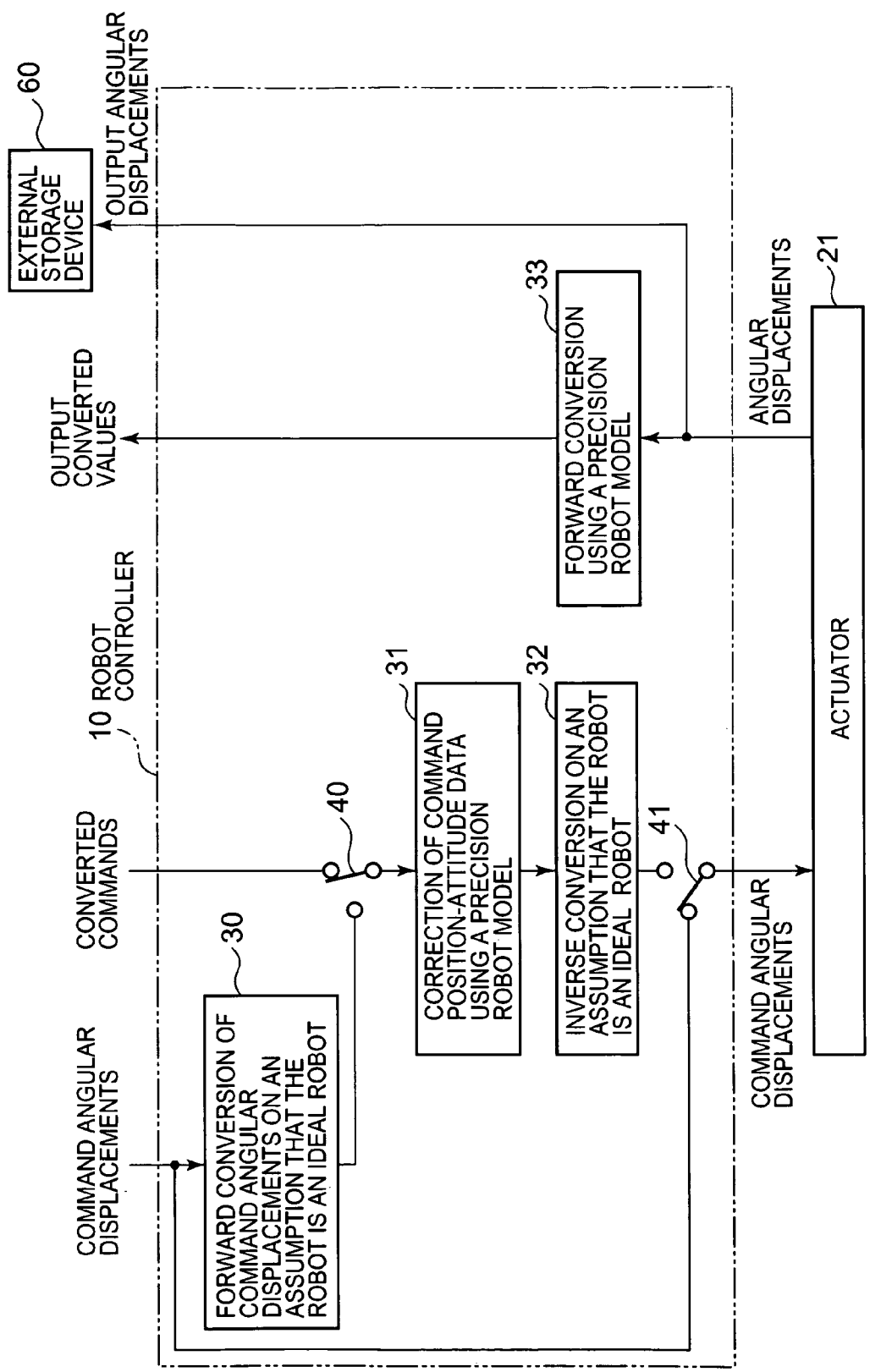
FIG. 13 is a block diagram of assistance in explaining an output operation to be performed by the robot controller shown in FIG. 1 to provide measured angular displacements for set points.

FIG. 13 is a block diagram of assistance in explaining an output operation to be performed by the robot controller 10 shown in FIG. 1 to provide measured angular displacements for set points. The output operation is performed, for example, to teach a position of the free end of the robot arm 20b and an attitude of the robot 20 by manually moving the robot arm 20b and manually positioning the free end of the robot arm 20b at a desired position instead of positioning the free end of the robot arm 20b by using the off-line teaching data 50.

The switch 41 is set so as to give input command angular displacements directly to the actuator 21. The input command angular displacements are given to the actuator 21. The robot controller 10 obtains measured angular displacements measured by the actuator 21 and provides the measured angular displacements as output angular displacements. The output angular displacements are stored in, for example, an external storage device 60.

Figure 14:
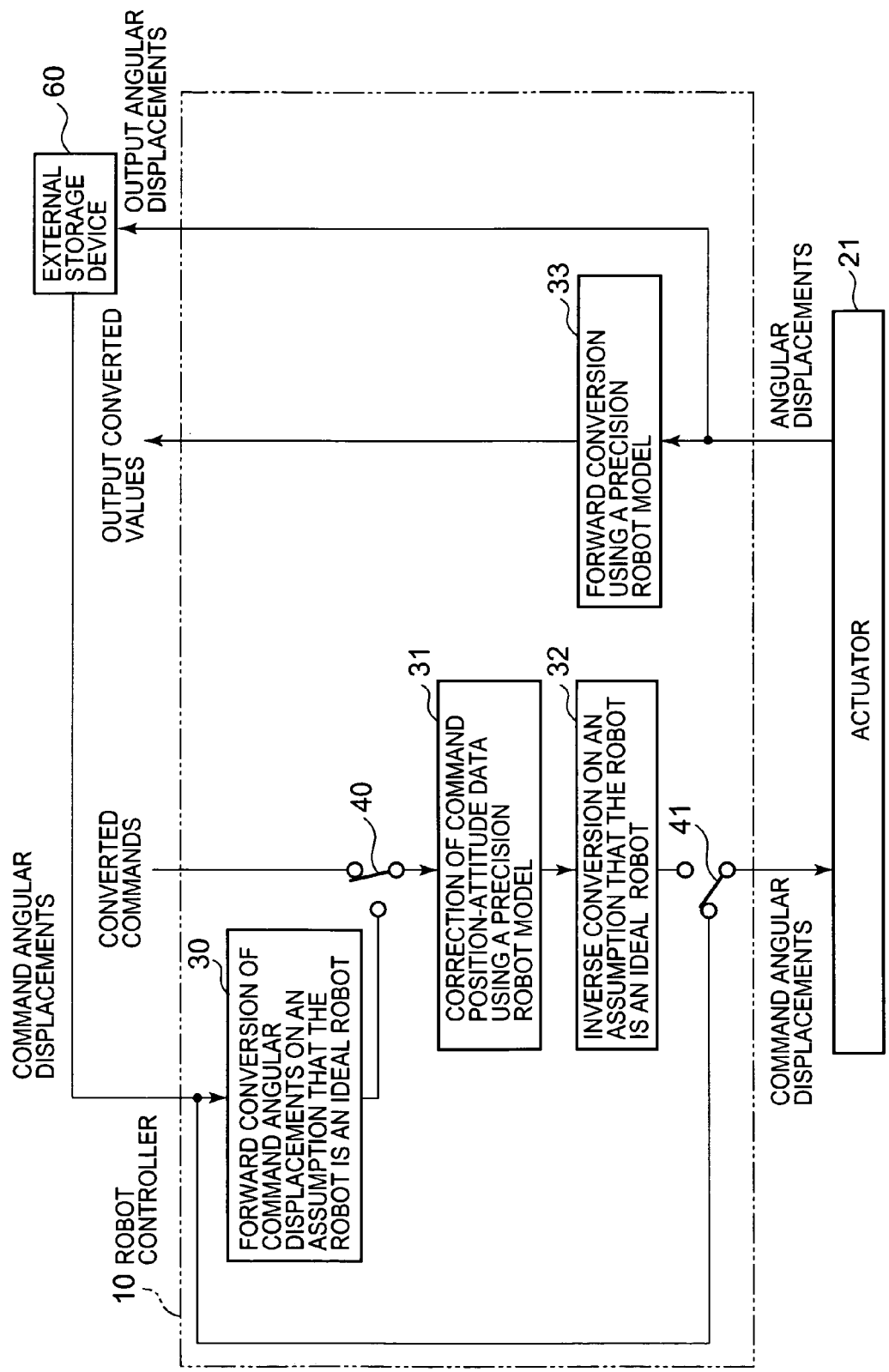
FIG. 14 is a block diagram of assistance in explaining an operation for using angular displacements provided by the robot controller shown in FIG. 1 as commands.

FIG. 14 is a block diagram of assistance in explaining an operation for using the angular displacements provided by the robot controller 10 shown in FIG. 1 as commands. The robot controller 10 reads the output angular displacements from the external storage device 60 and uses the same as command angular displacements to make the robot 20 play back the taught motions. The switch 41 is set so as to transmit the input command angular displacements to the actuator 21. Consequently, the output angular displacements read from the external storage device 60 are given as command angular positions to the actuator 21.

In the foregoing description, the external storage device 60 is used for storing the output angular displacements. The output angular displacements may be stored in the storage device 12 of the robot controller 10 instead of in the external storage device 60 and may be read from the storage device 12 to use the output angular displacements as command angular displacements to make the robot 20 play back the taught motions.

The angular displacements manually specified by manually leading the robot 20 is measured by the actuator 21, the measured angular displacements are stored in the storage device, and the measured angular displacements are read from the storage device to use the measured angular displacements as commands. Thus, the free end of the robot arm 20b can be positioned at a taught position. The angular displacements measured by the robot are stored and the stored angular displacements can be used as commands. Thus, the free end of the robot arm 20b can be surely positioned at a manually specified position.

The robot controller 10 shown in FIGS. 13 and 14 stores the measured angular displacements measured by the actuator 21 in the external storage device 60. The measured angular displacements may be converted into position-attitude data through forward conversion, and output converted data obtained by correcting the position-attitude data on the basis of the errors in the robot 20 through inverse correction using, for example, a precision robot model may be stored in the external storage device 60 or output angular displacements obtained by converting the output converted data obtained through inverse correction through inverse conversion may be stored in the external storage device 60. The output converted data and the output angular displacements stored in the external storage device 60 are used as conversion commands for the switch 40 and angular displacement commands for the block 30.

When the output angular displacements obtained by correcting through inverse correction using, for example, a precision robot model, on the basis of inherent errors in the robot 20 and converting through inverse conversion, namely, angular displacements that do not cause any positional deviation attributable to the inherent errors in the robot 20, are used as commands, the robot 20 may be instructed of the angular displacements obtained through sequential steps of forward conversion, correction and inverse conversion.

When the output converted values obtained by correcting through inverse correction using, for example, a precision robot model, on the basis of inherent errors in the robot 20, namely, position-attitude data that do not cause any positional deviation attributable to the inherent errors in the robot 20, are used as commands, the robot 20 may be instructed of angular displacements obtained through sequential steps of correction and inverse conversion.

Although the preferred embodiment described above corrects the positional deviation attributable to the inherent errors in the robot by correcting coordinates indicating a position and an attitude in a rectangular coordinate system by the error correcting system using the precision robot model, the positional deviation may be corrected by any suitable system other than the foregoing error correcting system.

What is claimed is:

1. A robot controller for controlling a robot including a robot arm having a free end, and drive shafts, comprising:
   an input device that accepts entered angular displacements by which the drive shafts of the robot arm are to be turned and position-attitude data indicating a position of the free end of the robot arm and an attitude of the robot in a rectangular coordinate system;
   a correcting device that corrects the position-attitude data entered by the input device based on predetermined and stored inherent errors in the robot;
      wherein the predetermined and stored inherent errors include at least one of a machining error, an assembling error, an error in origins of axes and an error by a deflection of the robot;
   an inverse conversion device that converts corrected position-attitude data corrected by the correcting device into angular displacements through an inverse conversion; and an instructing device that selects either the angular displacements entered by the input device or the angular displacements obtained through the inverse conversion by the inverse conversion device in accordance with a predetermined condition and instructs the robot of selected angular displacements.

2. The robot controller according to claim 1, further comprising:
a forward conversion device that converts the angular displacements entered by the input device into position-attitude data through a forward conversion;
wherein the correcting device selects either the position-attitude data entered by the input device or the position-attitude data obtained through the forward conversion by the forward conversion device in accordance with a predetermined condition, the correcting device determines selected position-attitude data that needs to be corrected and corrects only the selected position-attitude data that needs to be corrected.

3. The robot controller according to claim 2, further comprising:
a data acquiring device that acquires angular displacements of the drive shafts measured by the robot; and
an output device that outputs the angular displacements acquired by the data acquiring device.

4. The robot controller according to claim 1, further comprising:
a data acquiring device that acquires angular displacements of the drive shafts measured by the robot; and
an output device that outputs the angular displacements acquired by the data acquiring device.

5. The robot controller according to claim 4, further comprising:
an inverse correction device that converts the angular displacements acquired by the data acquiring device into position-attitude data through a forward conversion and correcting the position-attitude data obtained through the forward conversion to provide correct position-attitude data not causing any positional deviation attributable to the predetermined and stored inherent errors in the robot;
wherein the output device outputs the corrected position-attitude data corrected by the inverse correction device.

6. The robot controller according to claim 5, further comprising:
a second inverse conversion device that converts the corrected position-attitude data corrected by the inverse correction device into angular displacements;
wherein the output device outputs the angular displacements provided by the second inverse conversion device.

7. The robot controller according to claim 4, further comprising:
a storage device that stores the angular displacements acquired by the data acquiring device;
wherein the instructing device selects either the angular displacements entered by the input device or the angular displacements stored in the storage device in accordance with a predetermined condition and instructs the robot of selected angular displacements.

8. A robot controller for controlling a robot including a robot arm having a free end, and drive shafts, comprising:
a data acquiring device that acquires angular displacements of the drive shafts measured by the robot;
an inverse correction device that converts the angular displacements acquired by the
an inverse correction device that converts the angular displacements acquired by the data acquiring device into position-attitude data through a forward conversion and corrects the position-attitude data obtained through the forward conversion to provide correct position-attitude data that does not cause any positional deviation attributable to predetermined and stored inherent errors in the robot; and
an output device that outputs the corrected position-attitude data corrected by the inverse correction device and the angular displacements acquired by the data acquiring device.

9. A method for controlling a robot including a robot arm having a free end, and drive shafts, the method comprising:
entering input data into an input device, the input data comprising angular displacements by which the drive shafts of the robot arm are to be turned and position-attitude data indicating a position of the free end of the robot arm and an attitude of the robot in a rectangular coordinate system;
correcting, using a correcting device, the position-attitude data entered into the input device based on predetermined and stored inherent errors in the robot;
wherein the predetermined and stored inherent errors include at least one of a machining error, an assembling error, an error in origins of axes and an error by a deflection of the robot;
converting, using an inverse conversion device, the corrected position-attitude data corrected by the correcting device into angular displacements through an inverse conversion;
selecting, using an instructing device, either the angular displacements entered by the input device or the angular displacements obtained through the inverse conversion by the inverse conversion device in accordance with a predetermined condition; and
instructing the robot with the selected angular displacements.

* * * * *